Feb. 23, 1960 C W. MUSSER 2,925,658
SELF-ALIGNING TELESCOPE HOLDER
Filed Dec. 13, 1957
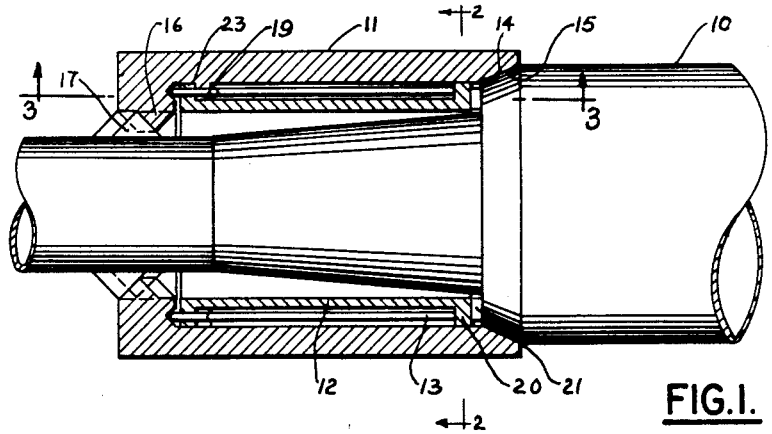
FIG.1.
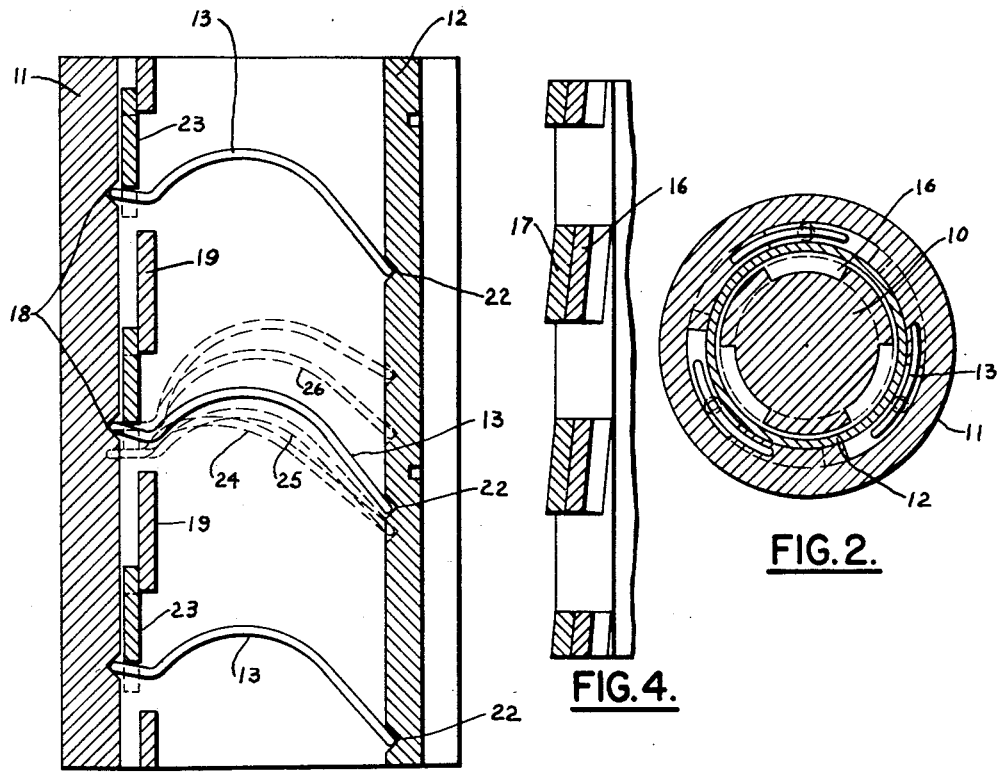
FIG.2.
FIG.3.
FIG.4.
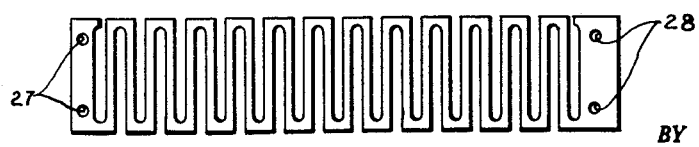
FIG.5.
INVENTOR.
C WALTON MUSSER

United States Patent Office 2,925,658
Patented Feb. 23, 1960

2,925,658

SELF-ALIGNING TELESCOPE HOLDER

C Walton Musser, Beverly, Mass., assignor to the United States of America as represented by the Secretary of the Army Application December 13, 1957, Serial No. 702,739

9 Claims. (Cl. 33—50)

(Granted under Title 35, U.S. Code (1952), sec. 266)

The invention described herein may be manufactured and used by or for the Government for governmental purposes without the payment of any royalty thereon.

This invention relates to holders for mounting a telescope on a support such as a gun or the like, and more particularly to an improved telescope holder which avoids the use of clamping screws and functions to exert a continuous force tending to align the telescope with its support.

Telescope holders heretofore available have usually involved the use of a screw for locking them to the telescope. This type of locking means involves the difficulty that variation in the pressure of the screw produces deviation in the position of the telescope. The present invention avoids this difficulty by the provision of an improved holder which maintains the telescope in positive alignment without the use of screws.

This improved holder is so designed that the telescope is easily inserted and removed. Upon each insertion, the telescope is positively aligned in identically the same relationship with its support. This result is achieved by the provision of two conical surfaces, on the holder and on the telescope, spaced some distance apart. The rearward conical surfaces, which are toward the eyepiece of the telescope, are plane conical surfaces. The forward conical surfaces are generated by a multiple thread. As the telescope is rotated, these forward conical surfaces, consisting of the multiple threads, tend to center the telescope, at the same time pulling the telescope forwardly so that the rear conical surfaces of the telescope and holder are forced together. In this position, they are subjected to a continuous force which keeps them in close contact.

The invention will be better understood from the following description considered in connection with the accompanying drawings and its scope is indicated by the appended claims.

Referring to the drawings:

Fig. 1 is a view, partly in section, illustrating a preferred embodiment of the invention, Fig. 2 is a section taken on the line 2—2 of Fig. 1, Fig. 3 illustrates the holder as rolled out flat and sectioned along the line 3 of Fig. 1, Fig. 4 illustrates the relation between the forward conical surfaces of the telescope and holder, and Fig. 5 illustrates a modification of the holder.

Fig. 1 illustrates a telescope 10 provided at its forward end with a holder which includes an outer cylinder 11, an inner cylinder 12 and a plurality of springs 13.

The outer cylinder 11 has at one end a conical surface 15 adapted to engage a similar surface 14 of the telescope and at the other end a multiple thread 16 adapted to engage a multiple thread 17 on the telescope. As shown more clearly in Fig. 3, the cylinder 11 also has dimples 18 which are spaced apart by 120 degrees and interrupted lugs 19 which are similarly disposed about the inner surface of the cylinder.

The inner cylinder 12 has at its right hand end a flange 20 provided with a tooth 21 for locking it to the telescope and with notches 22 (see Fig. 3) which are spaced apart by 120 degrees. At the other end of the inner cylinder 12 are interrupted lugs 23 which are adapted to cooperate with the lugs 19 for keeping the cylinders from moving axially with respect to one another.

In assembling the holder described above, the springs 13 are placed on the inner cylinder 12 as it is inserted into the cylinder 11. These springs have their right hand ends each in a different one of the notches 22 and assume the positions indicated by the dot-dash line 24 prior to insertion into the cylinder 11. In other words, the springs extend from a notch 22 in the cylinder 12 to the inner surface of the flange on cylinder 11 where they are retained by the lugs 19 and 23 and by the opposed walls of the cylinders 11 and 12.

As the telescope 10 and inner cylinder 12 are rotated clockwise with respect to the holder 11, the lugs 23 move away from the springs and the ends of the springs move up along the surface of the flange until they slip into the dimples 18. Then, as the cylinder 12 is moved forward as far as possible between the interrupted lugs and turned clockwise, the springs 13 are caused to slide along the inside of the outer cylinder through a position indicated at 25 to where they slip into the dimples 18.

Since the springs 13 tend to straighten out, the relation between the cylinders 11 and 12 will have two stable positions; one when the interrupted lugs on the cylinder 12 are against one side of the spring at dimples 18 and the other when these same interrupted lugs are on the other side of the spring at dimples 18.

In one of these positions, the interrupted threads of the four-threads-per-inch triple thread having a 90 degree included angle are aligned with the tooth 21 so that the telescope can be inserted into the holder. The telescope, after it engages with the tooth 21, is rotated until the springs are fully compressed, or when the dimples 18 are directly opposite the notches 22 as indicated by the dot-dash line 26. Turning the telescope slightly beyond this, the springs take over and tend to rotate the cylinder 12 until the triple thread on the telescope engages the triple thread on the outer cylinder. Since these are made with a 90 degree included angle and have a triple lead, they will center the forward portion of the telescope. At the same time, they tend to draw the telescope farther into the holder until the conical surfaces 14 and 15 of the telescope and cylinder 11 respectively are firmly engaged.

Rotating the telescope in the opposite direction causes the cylinder 12 to move in the opposite direction and to snap into the unlocked position where the telescope may be withdrawn rearwardly.

In a modified form of the telescope holder, the inner cylinder 12 and the springs 13 are replaced by a spring of the type illustrated by Fig. 5. This spring has at one end a pair of openings 27 through which it is attached to the outer cylinder 11 (see Fig. 1) and at the other end a pair of openings 28 through which this end of the spring is fixed to a key (not shown). This key is arranged to slide into a keyway on the member 10, the spring being somewhat compressed so that it forces the threads 16 and 17 together when the telescope is seated within the holder.

While the invention has been illustrated as applied to a telescope holder, it is obviously applicable to other situations where it is desired to have a careful alignment between a movable object and a fixed object. This spring has its longest dimension disposed circumferentially around the inside of the cylinder 11. When the telescope is rotated, the spring is compressed. The telescope is then moved longitudinally until the threads 17 on the telescope clear the threads 16 on the cylinder 11. At this point, the telescope is released, and the energy stored in the spring causes the spring to expand, turning the telescope in a counterclockwise direction. This rotation causes the thread 17 to engage with and ride upon thread 16 producing longitudinal displacement of the telescope. It is this displacement which ultimately brings the conical surface 14 and 15 together, the mating of which is responsible for the alignment of the parts.

This procedure is substantially the same as that which occurs with the embodiment shown in Figs. 1 and 3.

I claim:

1. The combination of means forming a support area having a conical bearing surface at one end and a thread at the other end, a cylinder encircling said area and having a thread and bearing surface adapted to cooperate with the thread and bearing surface of said area, an inner cylinder fixed to said support area means, and means including springs spaced apart by one hundred and twenty degrees and arranged between said inner and outer cylinders to exert a continuous force tending to tighten said threads, said force being continuous once said threads have become engaged and said springs stressed.

2. The combination of means forming a support area having a thread at one end and a bearing surface at the other end, an outer cylinder having a thread and bearing surface arranged to cooperate with the thread and bearing surface of said means, said cylinder having dimple adjacent its thread and locking means spaced inwardly from said dimple, an inner cylinder having notches at one end and having means arranged at the other end to cooperate with said locking means for fixing said cylinders together in an axial direction, and means arranged between said dimple and said notches to exert a continuous force tending to tighten said threads, said force being continuous once said threads have become engaged and said springs stressed.

3. The combination of means forming a support area having a triple thread at one end and a bearing surface at the other end, an outer cylinder having a thread and bearing surface arranged to cooperate with the thread and bearing of said means, said cylinder having dimples adjacent its thread and locking means spaced inwardly from said dimples, an inner cylinder having notches at one end and means arranged at the other end to cooperate with said locking means for fixing said cylinders together in an axial direction, and springs each arranged between one of said dimples and one of said notches to provide a force tending to tighten said threads.

4. The combination of means forming a support area having a thread at one end and a conical bearing surface at the other end, an outer cylinder having a thread and bearing surface arranged to cooperate with the thread and bearing surface of said means, said cylinder having dimples adjacent its thread and locking means spaced inwardly from said dimples, an inner cylinder having notches at one end and having means arranged at the other end to cooperate with said locking means for fixing said cylinders together in an axial direction, and means arranged between said dimples and said notches to exert a continuous force tending to tighten said threads, said force being continuous once said threads have become engaged and said springs stressed.

5. The combination of means forming a support area having a thread at one end and a bearing surface at the other end, an outer cylinder having a thread and bearing surface arranged to cooperate with the thread and bearing surface of said means, said cylinder having dimples adjacent its thread and interrupted lugs spaced inwardly from said dimples, an inner cylinder having notches at one end and having means arranged at the other end to cooperate with said interrupted lugs for fixing said cylinders together in an axial direction, and means arranged between said dimples and said notches to exert a continuous force tending to tighten said threads, said force being continuous once said threads have become engaged and said springs stressed.

6. The combination of means forming a support area having a triple thread with an included angle of 90° at one end and a conical bearing surface at the other end, an outer cylinder having a thread and bearing surface arranged to cooperate with the thread and bearing of said means, said cylinder having dimples adjacent its thread and locking means spaced inwardly from said dimples, an inner cylinder having notches at one end and means arranged at the other end to cooperate with said locking means for fixing said cylinders together in an axial direction, and springs each arranged between one of said dimples and one of said notches to provide a force tending to tighten said threads.

7. The combination of means forming a support area having at one end a first thread and at the other end a conical surface, an outer cylinder having at one end a surface adapted to cooperate with said conical surface and at the other end a thread adapted to cooperate with said first thread, said cylinder having dimples adjacent its thread and interrupted lugs spaced inwardly from said dimples, an inner cylinder having notches at one end and having interrupted lugs arranged at the other of its ends to cooperate with the lugs of said outer cylinder, and springs each arranged between one of said dimples and one of said notches to tighten said threads.

8. The combination of means forming a support area having at one end a first thread and at the other end a conical surface, an outer cylinder having at one end a surface adapted to cooperate with said conical surface and at the other end a thread adapted to cooperate with said first thread, said cylinder having dimples adjacent its thread and interrupted lugs spaced inwardly from said dimples, an inner cylinder having notches at one end and having interrupted lugs arranged at the other of its ends to cooperate with the lugs of said outer cylinder, springs each arranged between one of said dimples and one of said notches, and means coupling said inner cylinder to said support area means whereby rotation of one with respect to the other puts said springs in a stable position to exert a force tending to tightening said threads.

9. An apparatus for effecting self-alignment comprising a holder, a telescope for alignment in said holder, spring means having one end connected to said holder and an opposite end connected to said telescope, a similarly spaced conical bearing surface and multiple interrupted thread on each of said holder and telescope whereby on insertion of said telescope in said holder with partial relative rotation between the holder and telescope said spring means may be loaded and on release of the telescope the multiple interrupted thread on each of said holder and telescope is brought into cooperation with such thread on the other and effect a relative partial rotation under influence of said spring means and translation between said holder and telescope by sliding of the threads on one another whereby their conical bearing surfaces engage, which engagement acts to positively align said telescope in said holder.

References Cited in the file of this patent
UNITED STATES PATENTS 1,666,949    Slauson _____ Apr. 24, 1928